United States Patent
Chong et al.

(10) Patent No.: US 12,313,883 B2
(45) Date of Patent: May 27, 2025

(54) PHOTONIC BEAM STEERING DEVICE WITH WAVELENGTH SWEEP

(71) Applicant: Santec Holdings Corporation, Aichi (JP)

(72) Inventors: Changho Chong, Los Altos, CA (US); Masayuki Okano, Santa Clara, CA (US)

(73) Assignee: Santec Holdings Corporation, Komaki (JP)

( * ) Notice: Subject to any disclaimer, the term of this patent is extended or adjusted under 35 U.S.C. 154(b) by 334 days.

(21) Appl. No.: 18/177,896

(22) Filed: Mar. 3, 2023

(65) Prior Publication Data
US 2024/0295698 A1    Sep. 5, 2024

(51) Int. Cl.
| | |
|---|---|
| *G02B 6/26* | (2006.01) |
| *G01S 7/481* | (2006.01) |
| *G02B 6/293* | (2006.01) |
| *G02F 1/31* | (2006.01) |
| *G02F 1/313* | (2006.01) |

(52) U.S. Cl.
CPC ......... *G02B 6/262* (2013.01); *G02B 6/29338* (2013.01); *G02F 1/311* (2021.01); *G02F 1/313* (2013.01); *G01S 7/4815* (2013.01); *G01S 7/4817* (2013.01)

(58) Field of Classification Search
CPC ..... G02B 6/262; G02B 6/29338; G02F 1/311; G02F 1/313; G01S 7/4815; G01S 7/4817; G01S 17/42
See application file for complete search history.

(56) References Cited

U.S. PATENT DOCUMENTS

| | | | |
|---|---|---|---|
| 4,466,699 | A | 8/1984 | Droessler et al. |
| 5,022,745 | A | 6/1991 | Zayhowski et al. |
| 5,319,668 | A | 6/1994 | Luecke |
| 5,372,135 | A | 12/1994 | Mendelson et al. |
| 5,430,574 | A | 7/1995 | Tehrani |
| 5,491,524 | A | 2/1996 | Hellmuth et al. |
| 5,537,162 | A | 7/1996 | Hellmuth et al. |

(Continued)

FOREIGN PATENT DOCUMENTS

| | | |
|---|---|---|
| DE | 10 2011 114 797 A1 | 4/2013 |
| EP | 3 097 382 B1 | 10/2022 |

(Continued)

OTHER PUBLICATIONS

Aflatouni, et al., "Nanophotonic coherent imager," Optics Express 5118, vol. 23, No. 4, Feb. 23, 2015, DOI: 10.1364/OE.23.005117 (9 pages).

(Continued)

*Primary Examiner* — John Bedtelyon
(74) *Attorney, Agent, or Firm* — Foley & Lardner LLP

(57) ABSTRACT

A beam steering system includes a light source configured to generate an optical beam at various wavelengths. An array of emitters receives the beam and selectively emits the beam. An optical device receives the beam and directs the beam into an external environment of the beam steering system. The beam is directed into the external environment at different angles corresponding to a location of the emitter and the wavelength of the beam. As a result, the beam steering system steers the beam for a three-dimensional scan of the external environment.

20 Claims, 7 Drawing Sheets

(56) References Cited

U.S. PATENT DOCUMENTS

| | | |
|---|---|---|
| 5,561,523 A | 10/1996 | Blomberg et al. |
| 5,979,760 A | 11/1999 | Freyman et al. |
| 5,982,963 A | 11/1999 | Feng et al. |
| 6,070,093 A | 5/2000 | Oosta et al. |
| 6,111,645 A | 8/2000 | Tearney et al. |
| 6,134,003 A | 10/2000 | Tearney et al. |
| 6,160,826 A | 12/2000 | Swanson et al. |
| 6,275,718 B1 | 8/2001 | Lempert |
| 6,282,011 B1 | 8/2001 | Tearney et al. |
| 6,373,632 B1 | 4/2002 | Flanders |
| 6,421,164 B2 | 7/2002 | Tearney et al. |
| 6,485,413 B1 | 11/2002 | Boppart et al. |
| 6,501,551 B1 | 12/2002 | Tearney et al. |
| 6,556,853 B1 | 4/2003 | Cabib et al. |
| 6,564,087 B1 | 5/2003 | Pitris et al. |
| 6,725,073 B1 | 4/2004 | Motamedi et al. |
| 7,099,358 B1 | 8/2006 | Chong |
| 7,231,243 B2 | 6/2007 | Tearney et al. |
| 7,323,680 B2 | 1/2008 | Chong |
| 7,324,214 B2 | 1/2008 | De Groot et al. |
| 7,352,783 B2 | 4/2008 | Chong |
| 7,382,809 B2 | 6/2008 | Chong et al. |
| 7,388,891 B2 | 6/2008 | Uehara et al. |
| 7,400,410 B2 | 7/2008 | Baker et al. |
| 7,414,779 B2 | 8/2008 | Huber et al. |
| 7,428,057 B2 | 9/2008 | De Lega et al. |
| 7,489,713 B2 | 2/2009 | Chong et al. |
| 7,701,588 B2 | 4/2010 | Chong |
| 7,725,169 B2 | 5/2010 | Boppart et al. |
| 7,835,010 B2 | 11/2010 | Morosawa et al. |
| 7,865,231 B2 | 1/2011 | Tearney et al. |
| 7,869,057 B2 | 1/2011 | De Groot |
| 7,884,945 B2 | 2/2011 | Srinivasan et al. |
| 7,961,312 B2 | 6/2011 | Lipson et al. |
| 8,036,727 B2 | 10/2011 | Schurman et al. |
| 8,115,934 B2 | 2/2012 | Boppart et al. |
| 8,315,282 B2 | 11/2012 | Huber et al. |
| 8,405,834 B2 | 3/2013 | Srinivasan et al. |
| 8,427,649 B2 | 4/2013 | Hays |
| 8,500,279 B2 | 8/2013 | Everett et al. |
| 8,625,104 B2 | 1/2014 | Izatt et al. |
| 8,690,328 B1 | 4/2014 | Chong |
| 8,690,330 B2 | 4/2014 | Hacker et al. |
| 9,163,930 B2 | 10/2015 | Buckland et al. |
| 9,295,391 B1 | 3/2016 | Tearney et al. |
| 9,335,154 B2 | 5/2016 | Wax et al. |
| 9,490,607 B2 | 11/2016 | Chong |
| 9,851,433 B2 | 12/2017 | Sebastian |
| 10,838,047 B2 | 11/2020 | Chong |
| 11,067,671 B2 | 7/2021 | Chong |
| 11,067,816 B1 | 7/2021 | Ghosh |
| 11,391,841 B2 | 7/2022 | Bondy et al. |
| 11,971,589 B2 * | 4/2024 | Grieco .................. H04B 10/11 |
| 2001/0034478 A1 | 10/2001 | Lambert et al. |
| 2002/0163948 A1 | 11/2002 | Yoshida et al. |
| 2003/0020903 A1 | 1/2003 | Healy et al. |
| 2003/0080899 A1 | 5/2003 | Lee et al. |
| 2003/0089778 A1 | 5/2003 | Tsikos et al. |
| 2003/0210389 A1 | 11/2003 | Matsumoto et al. |
| 2004/0036838 A1 | 2/2004 | Podoleanu et al. |
| 2004/0036886 A1 | 2/2004 | Motamedi et al. |
| 2004/0257581 A1 | 12/2004 | Hogan |
| 2005/0030544 A1 | 2/2005 | Vanwiggeren et al. |
| 2005/0088661 A1 | 4/2005 | Froggatt |
| 2005/0171438 A1 | 8/2005 | Chen et al. |
| 2005/0201432 A1 | 9/2005 | Uehara et al. |
| 2005/0213103 A1 | 9/2005 | Everett et al. |
| 2006/0105209 A1 | 5/2006 | Thyroff et al. |
| 2006/0109872 A1 | 5/2006 | Sanders |
| 2006/0114471 A1 | 6/2006 | Cyr |
| 2006/0215713 A1 | 9/2006 | Flanders et al. |
| 2007/0040033 A1 | 2/2007 | Rosenberg |
| 2007/0076217 A1 | 4/2007 | Baker et al. |
| 2007/0081166 A1 | 4/2007 | Brown et al. |
| 2007/0133647 A1 | 6/2007 | Daiber |
| 2007/0141418 A1 | 6/2007 | Ota et al. |
| 2007/0171367 A1 | 7/2007 | Sebastian et al. |
| 2007/0233396 A1 | 10/2007 | Tearney et al. |
| 2007/0263226 A1 | 11/2007 | Kurtz et al. |
| 2007/0291277 A1 | 12/2007 | Everett et al. |
| 2008/0063028 A1 | 3/2008 | Lekkas et al. |
| 2008/0097194 A1 | 4/2008 | Milner |
| 2008/0269575 A1 | 10/2008 | Iddan |
| 2009/0022181 A1 | 1/2009 | Atkins et al. |
| 2009/0079993 A1 | 3/2009 | Yatagai et al. |
| 2009/0103050 A1 | 4/2009 | Michaels et al. |
| 2009/0103100 A1 | 4/2009 | Froggatt et al. |
| 2009/0169928 A1 | 7/2009 | Nishimura et al. |
| 2009/0247853 A1 | 10/2009 | Debreczeny |
| 2009/0268020 A1 | 10/2009 | Buckland et al. |
| 2009/0290613 A1 | 11/2009 | Zheng et al. |
| 2010/0110171 A1 | 5/2010 | Satake |
| 2010/0157308 A1 | 6/2010 | Xie |
| 2010/0246612 A1 | 9/2010 | Shimizu |
| 2010/0253908 A1 | 10/2010 | Hammer et al. |
| 2010/0284021 A1 | 11/2010 | Hacker |
| 2011/0080561 A1 | 4/2011 | Hayashi et al. |
| 2011/0112385 A1 | 5/2011 | Aalders |
| 2011/0205523 A1 | 8/2011 | Rezk et al. |
| 2011/0228218 A1 | 9/2011 | Hauger et al. |
| 2011/0235045 A1 | 9/2011 | Koerner |
| 2011/0255054 A1 | 10/2011 | Hacker et al. |
| 2011/0273719 A1 | 11/2011 | Froggatt |
| 2011/0299034 A1 | 12/2011 | Walsh et al. |
| 2012/0013849 A1 | 1/2012 | Podoleanu et al. |
| 2012/0026466 A1 | 2/2012 | Zhou et al. |
| 2012/0133950 A1 | 5/2012 | Suehira et al. |
| 2012/0136259 A1 | 5/2012 | Milner et al. |
| 2012/0188555 A1 | 7/2012 | Izatt et al. |
| 2013/0265545 A1 | 10/2013 | Buckland et al. |
| 2014/0051952 A1 | 2/2014 | Reichgott et al. |
| 2014/0055749 A1 | 2/2014 | Zhou et al. |
| 2014/0111774 A1 | 4/2014 | Komine |
| 2014/0228681 A1 | 8/2014 | Jia et al. |
| 2014/0268163 A1 | 9/2014 | Milner et al. |
| 2014/0293290 A1 | 10/2014 | Kulkarni |
| 2014/0336479 A1 | 11/2014 | Ando |
| 2015/0177380 A1 | 6/2015 | Satyan et al. |
| 2015/0223681 A1 | 8/2015 | Kuranov et al. |
| 2015/0342508 A1 | 12/2015 | Chong |
| 2015/0348287 A1 | 12/2015 | Yi et al. |
| 2016/0178346 A1 | 6/2016 | Kulkarni |
| 2016/0183780 A1 | 6/2016 | Docherty |
| 2016/0259038 A1 | 9/2016 | Retterath et al. |
| 2016/0266005 A1 | 9/2016 | Bos |
| 2016/0324593 A1 | 11/2016 | El-Haddad et al. |
| 2016/0343169 A1 | 11/2016 | Mullins et al. |
| 2016/0356881 A1 | 12/2016 | Retterath et al. |
| 2017/0009031 A1 | 1/2017 | Inokuchi et al. |
| 2017/0082735 A1 | 3/2017 | Slobodyanyuk et al. |
| 2017/0090031 A1 | 3/2017 | Bondy et al. |
| 2018/0088236 A1 | 3/2018 | Eichenholz et al. |
| 2018/0113200 A1 | 4/2018 | Steinberg et al. |
| 2018/0128594 A1 | 5/2018 | Lee et al. |
| 2018/0172920 A1 | 6/2018 | Froggatt et al. |
| 2018/0238675 A1 | 8/2018 | Wan |
| 2019/0257927 A1 | 8/2019 | Yao |
| 2019/0317194 A1 | 10/2019 | Chong |
| 2019/0317199 A1 | 10/2019 | Chong |
| 2020/0072941 A1 | 3/2020 | Jansen et al. |
| 2020/0072978 A1 | 3/2020 | Boloorian et al. |
| 2020/0081449 A1 | 3/2020 | Albelo |
| 2020/0292673 A1 | 9/2020 | Galloway et al. |
| 2020/0292674 A1 | 9/2020 | Angus et al. |
| 2020/0371239 A1 | 11/2020 | Rumala |
| 2021/0063549 A1 | 3/2021 | Chong |
| 2021/0116655 A1 | 4/2021 | Grieco et al. |
| 2021/0157000 A1 | 5/2021 | Imaki |
| 2021/0247497 A1 | 8/2021 | Li et al. |
| 2021/0247498 A1 | 8/2021 | Shi et al. |
| 2021/0356359 A1 | 11/2021 | Cyr et al. |

(56) References Cited

U.S. PATENT DOCUMENTS

| | | |
|---|---|---|
| 2021/0405194 A1 | 12/2021 | Tsuchida |
| 2022/0291386 A1* | 9/2022 | Canoglu ................. G01S 7/484 |
| 2023/0118658 A1* | 4/2023 | Shin ................... H04Q 11/0005 |
| | | 385/17 |

FOREIGN PATENT DOCUMENTS

| | | |
|---|---|---|
| JP | 2006-202543 A | 8/2006 |
| JP | 2008-188047 A | 8/2008 |
| JP | 2010-172538 A | 8/2010 |
| JP | 2010-540914 A | 12/2010 |
| JP | 2016-502665 A | 1/2016 |
| JP | 2017-502315 A | 1/2017 |
| JP | 2018-529099 | 10/2018 |
| WO | WO-2012/075126 A2 | 6/2012 |
| WO | WO-2013/168149 A1 | 11/2013 |
| WO | WO-2015/087564 A1 | 6/2015 |
| WO | WO-2015/121756 A2 | 8/2015 |
| WO | WO-2017/054036 A1 | 4/2017 |
| WO | WO-2017/176901 A1 | 10/2017 |
| WO | WO-2019/204301 A1 | 10/2019 |
| WO | WO-2020/135802 A1 | 7/2020 |
| WO | WO-2021/034798 A1 | 2/2021 |

OTHER PUBLICATIONS

Al-Hafeez Dhalla et al: "Simultaneous swept source optical coherence tomography of the anterior segment and retina using coherence revival", Optics Letters, vol. 37, No. 11,Jun. 1, 2012 (Jun. 1, 2012), p. 1883, XP55132997, ISSN: 0146-9592, DOI: 10.1364/OL.37. 001883.
Alshamrani et al., "A Non-Mechanical Multi-Wavelength Integrated Photonic Beam Steering System," Journal of Lightwave Technology, vol. 39, No. 12, Jun. 15, 2021, pp. 4201-4208.
Chan T. [ et al.]: 2-Dimensional beamsteering using dispersive deflectors and wavelength tuning. In: Optics Express, vol. 16, No. 19, 2008, S. 14617-14628.
Chong, et al. "Large Coherence Length Swept Source for Axial Length Measurement of the Eye," Applied Optics, 2009, pp. D145-D150, vol. 48, Issue 10.
Chopra et al., Topographical Thickness of the Skin in the Human Face, Aesthetic Surgery Journal, vol. 35(8), 2015, pp. 1007-1013.
Chowdhury, et al., "Challenges & Countermeasures in Optical Noninvasive Blood Glucose Detection," International Journal of Innovative Research in Science, Engineering and Technology, Jan. 2013, pp. 329-334, vol. 2, Issue 1.
Dai, et al., "Optical coherence tomography for whole eye segment imaging," Optics Express, Mar. 2012, pp. 6109-6115, vol. 20, Issue 6.
Dhalla, et al., "Simultaneous swept source optical coherence tomography of the anterior segment and retina using coherence revival," Optics Letters, 2012, pp. 1883-1885, vol. 37, No. 11.
Doerr et al., "Silicon-photonics multi-wavelength common-gain tunable laser providing both source and pump for an amplified transceiver," Opt. Lett. 46, 625-628 (2021) https://opg.optica.org/ol/abstract.cfm?URI=ol-46-3-625.
Fainman, et al., "Nanophotonics for Information Systems," Information Optics and Photonics, Oct. 1, 2010, pp. 13-37, T. Fournel and B. Javidi eds., Springer New York.
Hulme, et al., "Fully integrated hybrid silicon free-space beam steering source with 32 channel phased array," Proc. of SPIE vol. 8989 898907-1, 2014(15 pages).
Hyun-Woo Jeong et al: "Spectral-domain OCT with dual illumination and interlaced detection for simultaneous anterior segment and retina imaging", Optics Express, vol. 20, No. 17,Aug. 13, 2012 (Aug. 13, 2012), p. 19148, XP55219874, ISSN: 2161-2072, DOI: 10.1364/OE.20.019148.
International Preliminary Report on Patentability on International Application No. PCT/IB2015/000808 mailed on Aug. 4, 2016 (7 pages).
International Preliminary Report on Patentability on International Application No. PCT/US2015/019299 mailed on Sep. 13, 2016 (8 pages).
International Preliminary Report on Patentability on International Application No. PCT/US2015/032727 dated Dec. 8, 2016 (7 pages).
International Preliminary Report on Patentability on International Application No. PCT/US2016/035012 mailed on Dec. 14, 2017 (11 pages).
International Search Report and Written Opinion dated Aug. 26, 2015 for PCT/US15/32727 (8 pages).
International Search Report and Written Opinion for International Application No. PCT/US2021/019341 mailing date May 3, 2021, 10 pages.
International Search Report and Written Opinion in International Patent Application No. PCT/US2019/027671 mailed Jul. 1, 2019.
International Search Report and Written Opinion on International Application No. PCT/EP2009/009189 mailed on Apr. 6, 2010 (12 pages).
International Search Report and Written Opinion on International Application No. PCT/IB2015/000808 mailed on Oct. 20, 2015 (12 pages).
International Search Report and Written Opinion on International Application No. PCT/US2015/19299 mailed on Nov. 2, 2015(10 pages).
International Search Report and Written Opinion on International application No. PCT/US2016/035012 mailed on Aug. 18, 2016 (13 pages).
International Search Report on PCT/US2022/014505 dated May 11, 2022 (11 pages).
Jeong et al; Spectral-domain OCT with dual illumination and interlaced detection for simultaneous anterior segment and retina imaging. In: Optics Express. 2012, Bd. 20, H. 17, S. 19148-19159.
Jeong, et al., "Spectral-domain OCT with dual illumination and interlaced detection for simultaneous anterior segment and retina imaging," Optics Express, Aug. 2012, pp. 19148-19159, vol. 20, Issue 17.
Jia, et al., "Split-Spectrum Amplitude-Decorrelation Angiography with Optical Coherence Tomography," Optics Express, Feb. 2012, pp. 4710-4725, vol. 20 No. 4.
Koyama F. [ et al.]: Beam Steering, Beam Shaping, and Intensity Modulation Based on VCSEL Photonics, in IEEE Journal of Selected Topics in Quantum Electronics, vol. 19, No. 4, Jul.-Aug. 2013, S. 1701510-1701510, DOI: 10.1109/JSTQE.2013.2247980.
Lexer, et al., "Wavelength-tuning interferometry of intraocular distances," Applied Optics, 1997, pp. 6548-6553, vol. 36, Issue 25.
Mariampillai, et al., "Speckle Variance Detection of Microvasculature Using Swept-Source Optical Coherence Tomography," Optics Letters, Jul. 2008, pp. 1530-1532, vol. 33 No. 13.
Masayuki Okano and Changho Chong, "Swept Source Lidar: simultaneous FMCW ranging and nonmechanical beam steering with a wideband swept source," Opt. Express 28, 23898-23915 (2020).
Nankivil, et al., "Handheld, rapidly switchable, anterior/posterior segment swept source optical coherence tomography probe," Biomedical Optics Express, Nov. 2015, pp. 4516-4528, vol. 6, Issue 11.
Office Action for German Application No. 112019002028.5 Dtd Feb. 1, 2022, 8 pages.
Ortiz, et al., "Corneal Topography From Spectral Optical Coherence Tomography (sOCT)," Biomedical Optics Express, Dec. 2011, pp. 3232-3247, vol. 2, No. 12.
Pierrottet, D. et al., "Linear FMCW Laser Radar for Precision Range and Vector Velocity Measurements," MRS Proceedings, 1076-K04-06; doi: 10.1557/PROC-1076-K04-06 (9 pages).
Poddar, et al., "Non-Invasive Glucose Monitoring Techniques: A Review and Current Trends," Oct. 2008, pp. 1-47.
Poulton, et al., "Coherent solid-state LIDAR with silicon photonic optical phased arrays," vol. 42, No. 20, Oct. 15, 2017, Optics Letters 4091 (6 pages).
Qian, Ruobing, et al. "Video-Rate High-Precision Time-Frequency Multiplexed 3D Coherent Ranging." ArXiv.org, Oct. 20, 2020, arxiv.org/abs/2008.05805.
Sandborn P.: FMCW Lidar: Scaling to the Chip-Level and Improving Phase-Noise-Limited Performance. University of California, Berkeley, 2017.

(56) References Cited

OTHER PUBLICATIONS

Sarlet, et al., "Wavelength and Mode Stabilization of Widely Tunable SG-DBR and SSG-DBR Lasers," IEEE Photonics Technology Letters, Nov. 1999, pp. 1351-1353, vol. 11, Issue 11.

Segawa, et al., "Semiconductor Double-Ring-Resonator-Coupled Tunable Laser for Wavelength Routing," IEEE Journal of Quantum Electronics, Jul. 2009, pp. 892-899, vol. 45, Issue 7.

Snyder, "Wide dynamic range optical power measurement using coherent heterodyne radiometry," Applied Optics, Nov. 1, 1988, vol. 27, No. 21, pp. 4465-4469.

Tayebati, et al., "Microelectromechanical tunable filter with stable half symmetric cavity," Electronics Letters, Oct. 1998, pp. 1967-1968, vol. 34, Issue 20.

Van Rees et al., "Ring resonator enhanced mode-hop-free wavelength tuning of an integrated extended-cavity laser," Opt. Express 28, 5669-5683 (2020).

White et al., "In Vivo Dynamic Human Retinal Blood Flow Imaging Using Ultra-High-Speed Spectral Domain Optical Doppler Tomography," Optics Express, Dec. 15, 2003, vol. 11, No. 25, pp. 3490-3497.

Wim Bogaerts, Marcus Dahlem, Sarvagya Dwivedi, Roelof Jansen, Xavier Rottenberg, "Dispersive optical phased array circuit for high-resolution pixelated 2D far-field scanning controlled by a single wavelength variable," Proc. SPIE 11284, Smart Photonic and Optoelectronic Integrated Circuits XXII, 112841Z (Feb. 26, 2020); doi: 10.1117/12.2544937.

Xiang et al. High-performance lasers for fully integrated silicon nitride photonics. Nat Commun 12, 6650 (2021). https://doi.org/10.1038/s41467-021-26804-9.

Zhao, Y. et al., "Doppler Standard Deviation Imaging for Clinical Monitoring of In Vivo Human Skin Blood Flow," Optics Letters, Sep. 15, 200, vol. 25, No. 18, pp. 1358-1360.

Zhou, et al., "Space-division multiplexing optical coherence tomography," Opt. Exp., Aug. 12, 2013, vol. 21, No. 16, pp. 19219-19227.

\* cited by examiner

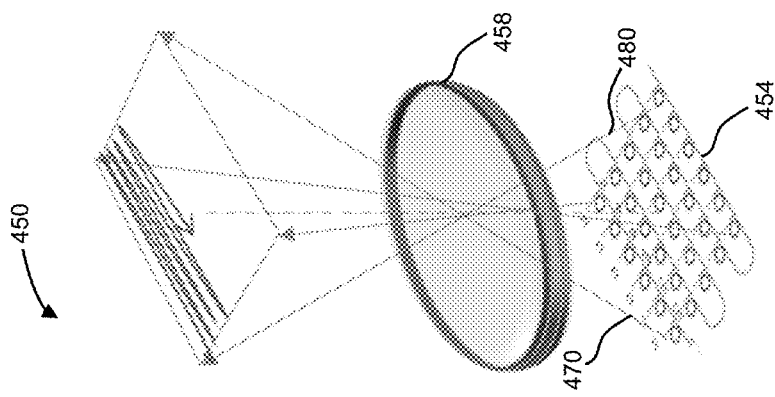
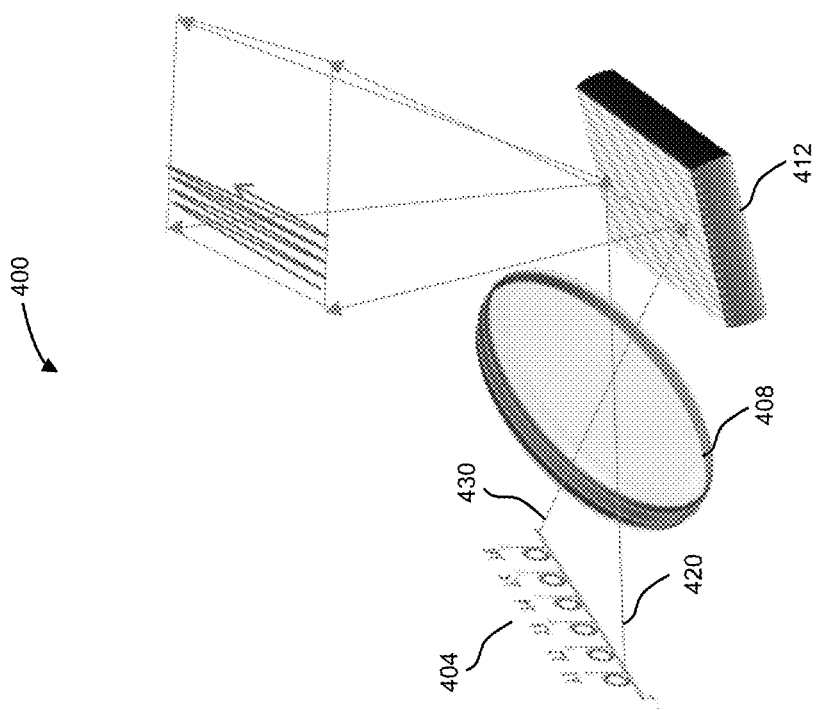
FIG. 4

PHOTONIC BEAM STEERING DEVICE WITH WAVELENGTH SWEEP

BACKGROUND

The following description is provided to assist the understanding of the reader. None of the information provided or references cited is admitted to be prior art.

Beam steering is a key technique to facilitate scanning a beam in many applications such as LIDAR sensors, autonomous vehicles, and 3D optical profiling system. Mechanical components such as MEMS mirrors and polygon scanners, which have traditionally been used in combination with various light sources and detectors, may raise issues in reliability, and its bulky size may prevent proper operation of sophisticated applications such as vision sensors for robots and automobile applications. While solid-state devices have attracted attention since they do not involve mechanical components, control systems of such devices are generally relatively complicated and require complex calibration processes. One can use heating elements to change wavelength of a beam and thus steer the beam, but temperature control is not practically suitable for rapid switching of the beam wavelength and the direction, particularly where detection of targets and determination of movement of the targets are required to be performed in a reliable, continuous, and timely manner. Thus, a beam steering technique with rapid switching of the beam direction is needed in order for a machine (e.g., LIDAR, autonomous vehicles) to operate properly and safely. As described herein, selective activation of emitters with different emitting wavelengths allows for rapid switching of the beam direction and/or wavelength for a three-dimensional scan.

SUMMARY

The present technology provides photonic beam steering systems with wavelength sweep and methods of using the same. In one embodiment, a beam steering system includes a tunable light source configured to direct a wavelength-swept beam and an array of emitters, wherein a first emitter of the array of emitters is configured to selectively emit a first beam at a first wavelength, the first wavelength is a portion of wavelengths of a first wavelength-swept beam, and a second emitter of the array of emitters is configured to selectively emit a second beam at a second wavelength, the second wavelength is a portion of wavelengths of a second wavelength-swept beam and is different from the first wavelength. The system also includes an optical device, arranged along a path of the first beam and the second beam, the optical device configured to receive the first beam and the second beam and to direct the first beam at a first angle and the second beam at a second angle into an external environment of the beam steering system.

In some embodiments, at least one of the emitters is coupled with an optical ring resonator, and an operating wavelength of the optical ring resonator is associated with the wavelength at which the coupled emitter emits the beam.

In some embodiments, the beam steering system further comprises an optical component configured to receive the wavelength-swept beam from the light source and to selectively transmit at least a portion of the beam to at least one of the emitters.

In some embodiments, the array of emitters may be a one-dimensional array.

In some embodiments, each emitter is coupled with an optical ring resonator with a free spectral range (FSR) and a bandwidth (BW), and an operating wavelength of each optical ring resonator is offset by FSR/N from an operating wavelength of a neighboring optical ring resonator, wherein N is a number of emitters in the array.

In some embodiments, the array of emitters may be a two-dimensional array, wherein the array comprises a plurality of rows, each row comprising a plurality of the emitters.

In some embodiments, the emitters within each row are connected to each other through a waveguide, and the rows are connected to a bus line via an optical switch.

In some embodiments, the emitters within each row are connected to each other through a waveguide. The connected emitters within a first row emit the beams in a second range of wavelength, and the second range of wavelength is a portion of a first range of wavelength of the wavelength-swept beam. The connected emitters within a second row emit the beams in a fourth range of wavelength, and the fourth range of wavelength is a portion of a third range of wavelength of the wavelength-swept beam. The fourth range of wavelength is different from the second range of wavelength, and the rows are connected to a bus line via a bandpass filter.

In some embodiments, the bandpass filter may be an active tunable filter synchronously tuned to coincide with the range of wavelength in which the emitters of each row emit the beams.

Another aspect of the present invention includes a method of utilizing a beam steering system. The method comprises controlling a tunable light source to direct a wavelength-swept beam, selectively emitting, by a first emitter of the array of emitters, a first beam at a first wavelength. The first wavelength is a portion of wavelengths of a first wavelength-swept beam. The method further comprises receiving, by an optical device arranged along a path of the first beam, the first beam and directing, by the optical device, the first beam at a first angle of a plurality of angles into an external environment of the beam steering system. The method further comprises selectively emitting, by a second emitter of the array of emitters, a second beam at a second wavelength. The second wavelength is a portion of wavelengths of a second wavelength-swept beam. The method further comprises receiving, by the optical device, the second beam and directing, by the optical device, the second beam at a second angle of the plurality of angles into the external environment of the beam steering system.

In some embodiments, the method comprises narrowing, by utilizing an optical ring resonator, the range of wavelength of the beams being transmitted to the emitters.

In some embodiments, the method comprises selectively transmitting, by an optical component, the beam to the emitters.

In some embodiments, the second wavelength-swept beam is the first wavelength-swept beam.

In some embodiments, the method comprises utilizing a one-dimensional array of emitters.

In some embodiments, the method comprises selectively filtering, by utilizing an optical ring resonator with a free spectral range (FSR), the wavelength at which each emitter emits, and offsetting an operating wavelength of each optical ring resonator by FSR/N from an operating wavelength of a neighboring optical ring resonator, wherein N is a number of emitters in the array.

In some embodiments, the method comprises utilizing a two-dimensional array of emitters wherein the array comprising a plurality of rows, each row comprising a plurality of the emitters.

In some embodiments, the method comprises directing the first beam in a first range of wavelength towards each row of the array, and selectively transmitting, based on a status of an optical switch connected to each row, the first beam in a second range of wavelength to the emitters in one of the rows. The method further comprises selectively emitting, by one of the emitters within the row, the beam at the first wavelength. The method further comprises directing the second beam in a third range of wavelength towards each row of the array and selectively transmitting, based on the status of the optical switch connected to each row, the second beam in a fourth range of wavelength to the emitters in another row of the rows. The method further comprises selectively emitting, by one of the emitters within the row, the beam at the second wavelength.

In some embodiments, the method comprises directing the first beam in a first range of wavelength towards each row of the array, selectively transmitting, based on an operating wavelength of a bandpass filter connected to each row, the first beam in a second range of wavelength to the emitters in one of the rows, the second range of wavelength associated with the operating wavelength of the bandpass filter. The method further comprises selectively emitting, by one of the emitters within the row, the beam at the first wavelength, directing the second beam in a third range of wavelength towards each row of the array, selectively transmitting, based on the operating wavelength of the bandpass filter, connected to each row, the second beam, in a fourth range of wavelength to the emitters in another row of the rows, the fourth range of wavelength associated with the operating wavelength of the bandpass filter. The method further comprises selectively emitting, by one of the emitters within the row, the beam, at the second wavelength.

In some embodiments, the method comprises utilizing an active tunable filter for the bandpass filter to synchronously coincide with the range of wavelength in which the emitters of each row emit the beams.

In some embodiments, the method comprises utilizing a first stage wide filter with a bandwidth equal to FSR to narrow the range of wavelength of the beams being transmitted to the rows of emitters, and limiting a focal spectral range (FSR) of an optical ring resonator coupled with each emitter to narrow the range of wavelength of the transmitted beam.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 depicts example configurations of a beam steering system with a one-dimensional array of emitters and a beam steering system with a two-dimensional array of emitters in accordance with an illustrative embodiment.

DETAILED DESCRIPTION

Figure 1:
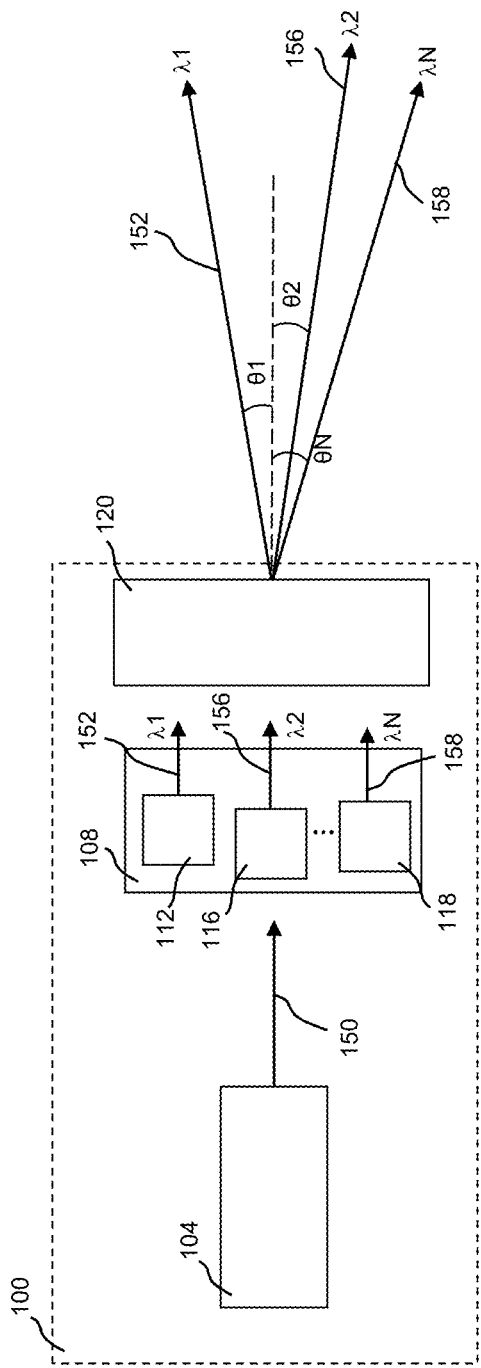
FIG. 1 depicts a representation of a beam steering system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein is a beam steering system wherein a plurality of emitters selectively emit beams at various wavelengths. The beam steering system beneficially utilizes a plurality of emitters located at different locations to enable selective activation of emitters with different emitting wavelengths. As described herein, such a configuration allows for rapid switching of the beam direction and/or the wavelength.

Described herein are systems and methods for beam steering.

As will be discussed in further detail below, a beam steering system includes a light source that is controlled to provide a source beam at various wavelengths. An array of emitters, arranged along a path of the source beam, receives the source beam. A first emitter in the array of emitters may emit a first beam at a first wavelength, and a second emitter in the array of emitters may emit a second beam at a second wavelength, wherein the first wavelength and the second wavelength may be a portion of the various wavelengths of the source beam. An optical device, arranged along the path of the first beam and the second beam, receives the first beam and the second beam from the array of emitters and directs the first beam and the second beam into an external environment of the beam steering system. The optical device directs the first beam at a first angle and directs the second beam at a second angle, each angle corresponding to a location of the emitter and/or the wavelength of the beam.

Referring to FIG. 1, a beam steering system 100 is shown. The beam steering system 100 includes a light source 104. In some embodiments, a source beam 150 may be a collimated beam (e.g., a laser). Additionally, the light source 104 may be configured for adjustment of a wavelength λ of the beam. In this regard, the light source 104 may output a tunable laser beam wherein at least the wavelength λ of the laser beam is tuned. The light source 104 may be configured for adjustment of the wavelength λ of the collimated beam across a range. The light source 104 may be swept across the range of wavelengths λ.

In FIG. 1, the beam steering system 100 is also shown to include an array of emitters 108. The array of emitters 108 receives the source beam 150, directly from the light source 104 or via one or more optical components (e.g., waveguide, optical switch, filter, etc.). Such optical components may be included to selectively transmit the source beam 150 into the emitters in the array of emitters 108, for example, by controlling whether to transmit the beam (i.e., switching on/off) or by limiting a wavelength or a range of wavelength to be transmitted (i.e., filtering). This allows for selective activation of different emitters at different locations, the emitters configured to emit at different wavelengths.

The array of emitters may include a first emitter 112, a second emitter 116, and an N-th emitter 118, wherein any number of emitters may be arranged in various manners (e.g., one-dimensional, two-dimensional, randomly-arranged, etc.). The first emitter 112 is configured to emit a first beam 152 at a first wavelength, $\lambda 1$, the second emitter 116 is configured to emit a second beam 156 at a second wavelength, $\lambda 2$, and the N-th emitter 118 is configured to emit an N-th beam 158 at an N-th wavelength, $\lambda N$. The wavelengths $\lambda 1$, $\lambda 2$, and $\lambda N$ may be a portion of various wavelengths of the source beam 150. In some embodiments, $\lambda 1$ may be similar or identical to $\lambda 2$. In some embodiments, $\lambda 1$ may be significantly different from $\lambda 2$. In some embodiments, the emitters in the array of emitters 108 may be coupled with optical components (e.g., optical ring resonators). Such optical components may be coupled with the emitters to allow the emitters to selectively emit at a wavelength or at a range of wavelength associated with an operating wavelength of the optical components. Combining such optical components (e.g., optical ring resonators) with the optical components previously mentioned above (e.g., optical switch, filter, etc.), the beam steering system 100 may selectively activate different emitters at different locations and may be configured to emit at different wavelengths, thereby providing a 3D beam scan with rapid switching of direction.

In FIG. 1, the beam steering system 100 is shown to include an optical device 120. The optical device 120 is configured to receive the beams 152, 156, and 158 from the array of emitters 108. The optical device 120 is configured to direct the beams 152, 156, and 158 into an external environment of the beam steering system 100. The optical device 120 directs the first beam 152 at a first angle $\theta 1$, directs the second beam 156 at a second angle $\theta 2$, and directs the N-th beam 158 at an N-th angle $\theta N$, each angle corresponding to a location of the emitter and/or the wavelength of the beam. The optical device 120 may include an optical component such as, but not limited to, a lens, a lens system, a photonic crystal, a nanostructure, a grating, or a wavelength dispersive element. In some embodiments, more than one optical components may be utilized for the optical device 120. While the beam steering system 100 is shown to include the optical device 120, in some embodiments, the beam steering system 100 may not necessarily include the optical device 120.

Figure 2:
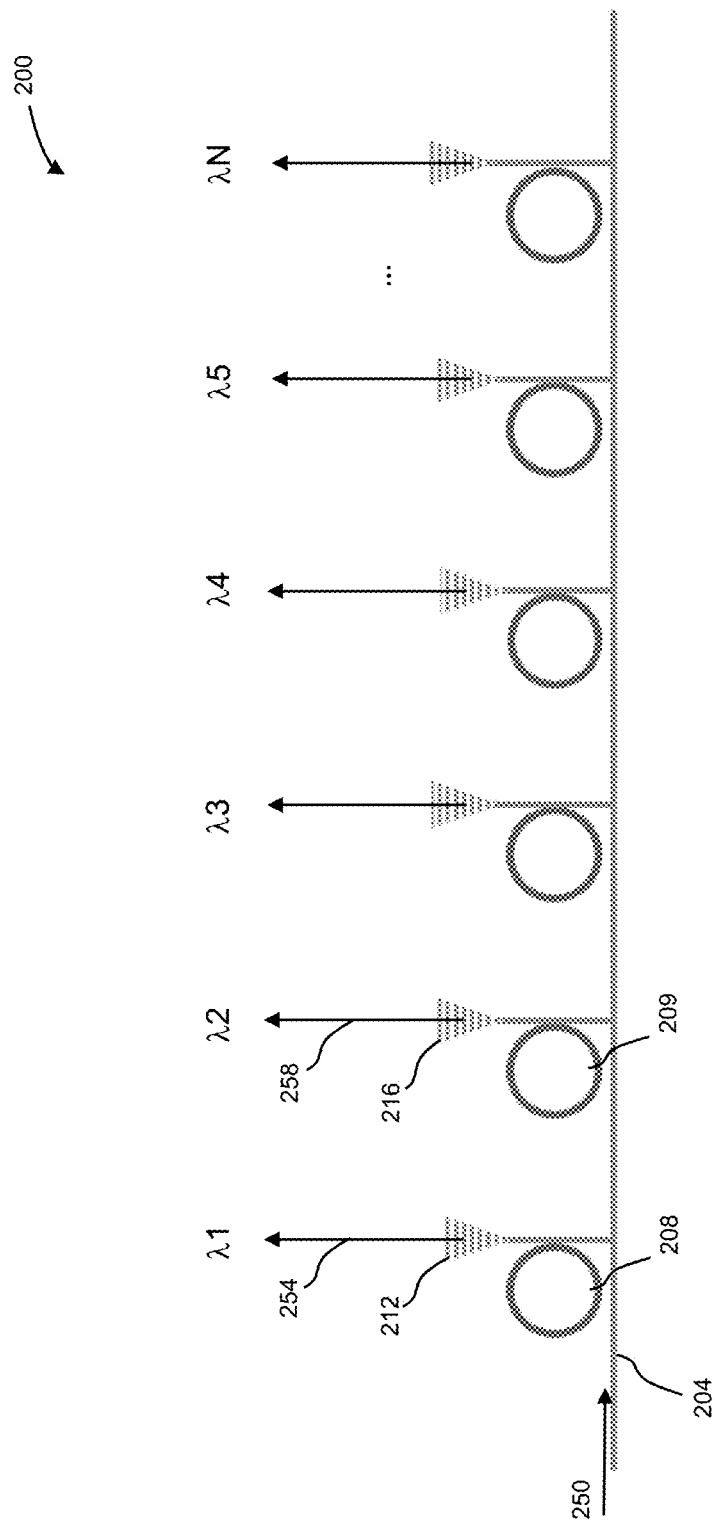
FIG. 2 depicts a representation of a one-dimensional array of emitters in accordance with an illustrative embodiment.

Referring now to FIG. 1 and FIG. 2, the beam steering system 100 may include a one-dimensional array of emitters 200. Specifically, depicted in FIG. 2 is another example of the array of emitters 108 wherein the array of emitters 108 is the one-dimensional array of emitters 200.

Referring to FIG. 2, the one-dimensional array of emitters 200 may include a waveguide 204. The emitters in the array of emitters 200 may be connected to the waveguide 204, via which a source beam 250 is directed to the emitters in the array of emitter 200.

Referring to FIG. 2, the one-dimensional array of emitters 200 may further include optical ring resonators. Each emitter in the array of emitters 200 may be coupled with an optical ring resonator (e.g., a first optical ring resonator 208 coupled to a first emitter 212, a second optical ring resonator 209 coupled to a second emitter 216). Each of the optical ring resonators may include a set of waveguides, in which at least one waveguide is a closed loop and may include the waveguide 204 or a part of the waveguide 204. The optical ring resonators (e.g., the first optical ring resonator 208) are configured to couple a source beam 250 and an output beam (e.g., a first beam 254). Specifically, when the source beam 250 at a resonant wavelength of the optical ring resonator (or the wavelength of the source beam 250 including the resonant wavelength of the optical ring resonator) is passed through the loop from the input waveguide (e.g., the waveguide 204), the optical ring resonator builds up in intensity over multiple round-trips due to constructive interference. Because only a select few wavelengths will be at resonance within the loop, the optical ring resonators function as filtering the beam that the emitter emits (e.g., the first beam 254 the first emitter 212 emits). In some embodiments, it is possible to create high-order optical filters by cascading many optical ring resonators in series.

In some embodiments, the resonant wavelengths of the ring resonators may be similar to one another. For instance, a wavelength, $\lambda 1$, of the first beam 254, which has been filtered from the first optical ring resonator 208 and emitted from the first emitter 212, may be similar to a wavelength, $\lambda 2$, of a second beam 258, which has been filtered from the second optical ring resonator 209 and emitted from the second emitter 216.

In some embodiments, the resonant wavelengths of the optical ring resonators coupled to the respective emitters may be significantly different from one another. For instance, the wavelength, $\lambda 1$, of the first beam 254, which has been filtered from the first optical ring resonator 208 and emitted from the first emitter 212, may be significantly different from the wavelength, $\lambda 2$, of the second beam 258, which has been filtered from the second optical ring resonator 209 and emitted from the second emitter 216.

Figure 3:
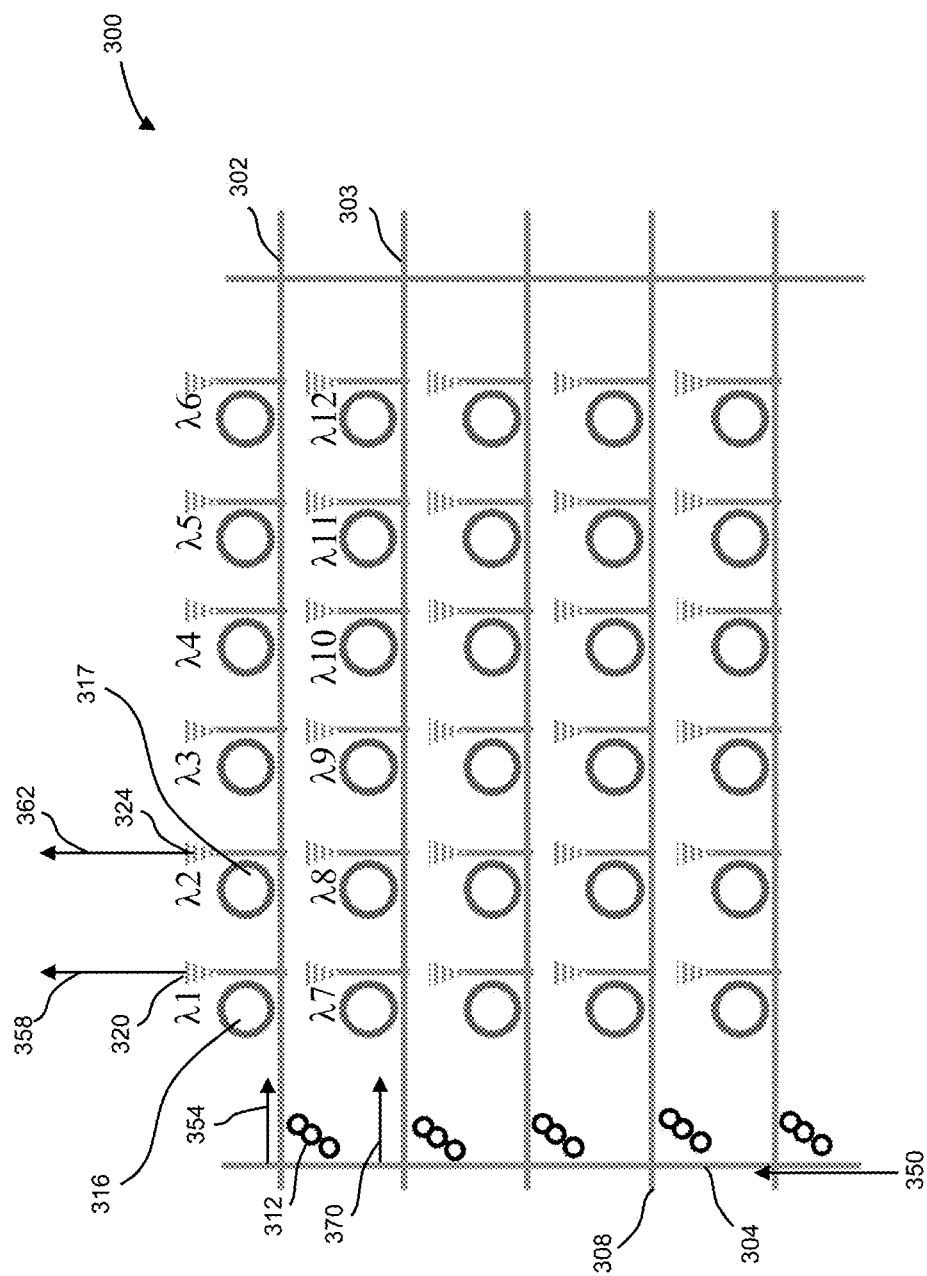
FIG. 3 depicts a representation of a two-dimensional array of emitters in accordance with an illustrative embodiment.

Referring now to FIG. 3, the beam steering system 100 may include a two-dimensional array of emitters 300. Specifically, depicted in FIG. 3 is another example of the array of emitters 108 wherein the array of emitters 108 is the two-dimensional array of emitters 300. The two-dimensional array of emitters 300 includes a plurality of rows (e.g., a first row 302, a second row 303, etc.), wherein the plurality of rows are connected to a first waveguide 304 and the emitters within each of the rows (e.g., a first emitter 320, a second emitter 324, etc.) are connected to a second waveguide 308. The plurality of rows may include various optical components (e.g., beam transmitting components 312, optical ring resonators 316, 317). In some embodiments, the first waveguide 304 and the second waveguides 308 may form a continuous line of waveguides.

Referring to FIG. 3, the first waveguide 304 directs the source beam 350 into the second waveguides 308. The second waveguides 308 receive a portion of the source beam and direct the portion of the beam into the emitters in the row. The portion of the source beam may be a portion of wavelengths of the source beam 350. For example, the source beam 350 may be in a first range of wavelength. The second waveguide 308 in the first row 302 may receive a portion of the source beam 354 in a second range of wavelength, the second range of wavelength being a portion of the first range of wavelength. At another time, the source beam 350 may be in a third range of wavelength, the third range of wavelength may or may not be similar to the first range of wavelength. The second waveguide 308 in the second row 303 may receive a portion of the source beam 370 in a fourth range of wavelength, the fourth range of wavelength being a portion of the third range of wavelength, while the second waveguide 308 in the first row 302 may or may not receive a portion of the source beam. In some embodiments, when the source beam 350 is transmitted through the first waveguide 304, each of the second waveguides 308 may receive a respective portion of the source beam 350. For example, the source beam 350 may be a wavelength-swept beam, and the second waveguide 308 of the first row 302 may receive a first portion of the wavelength-swept beam, and the second waveguide 308 of the second row 303 may receive a second portion of the wavelength-swept beam.

The transmission of the source beam 350 into the second waveguides 308 may be controlled by beam transmitting components 312, which selectively transmit a portion of the source beam 350 into the second waveguides 308. The beam transmitting components 312 are coupled with the first waveguide 304 and/or the second waveguides 308. In some embodiments, the portion of the source beam 350 that the beam transmitting components 312 selectively transmit at the first row 302 may be different from the portion of the source beam 350 that the beam transmitting components 312 selectively transmit at the second row 303. In some embodiments, the portion of the source beam 350 that the beam transmitting components 312 selectively transmit at the first row 302 may be the same as the portion of the source beam 350 that the beam transmitting components 312 selectively transmit at the second row 303.

In some embodiments, the two-dimensional array of emitters includes optical switches for the beam transmitting components 312. In some embodiments, the first waveguide 304 is a bus line waveguide wherein an optical switch is coupled to the second waveguide 308 of each row and/or the first waveguide 304. The beam transmitting components 312 may control whether to transmit the source beam 350 into the second waveguide 308. For example, the beam transmitting component 312 in the first row 302 may control whether the beam in the second range of wavelength 354 can be transmitted into the first row 302, and the beam transmitting component 312 in the second row 303 may control whether the beam in the fourth range of wavelength 370 can be transmitted into the second row 303. In some embodiments, the second range of wavelength and the fourth range of wavelength may be similar or identical. In some embodiments, instead of the second range of wavelength being a portion of the first range of wavelength of the source beam 350, the second range of wavelength may be similar or identical to the first range of wavelength of the source beam 350.

In some embodiments, the two-dimensional array of emitters includes bandpass filters for the beam transmitting components 312. In some embodiments, the first waveguide 304 is a bus line waveguide wherein a bandpass filter is coupled to the second waveguide 308 of each row and/or the first waveguide 304. The beam transmitting components 312 may determine a range of wavelength to be transmitted into the second waveguides 308. For example, the beam transmitting component 312 in the first row 302 may determine the second range of wavelength of the beam 354 to be transmitted into the first row 302, and the beam transmitting component 312 in the second row 303 may determine the fourth range of wavelength of the beam 370 to be transmitted into the second row 303. In some embodiments, the second range of wavelength and the fourth range of wavelength may be significantly different.

In some embodiments, the beam transmitting components 312 may be active tunable filters, which may be synchronously tuned to coincide with a portion of the source beam 350. For instance, the beam transmitting component 312 in the first row 302 may be an active tunable filter that is synchronously tuned to coincide with the beam in the second range of wavelength 354, and the beam transmitting component 312 in the second row 303 may be an active tunable filter that is synchronously tuned to coincide with the beam in the fourth range of wavelength 370. In some embodiments, the second range of wavelength and the fourth range of wavelength may be significantly different.

Referring to FIG. 3, the two-dimensional array of emitters 300 may further include optical ring resonators. Each emitter in the array of emitters 300 may be coupled with an optical ring resonator (e.g., a first optical ring resonator 316 coupled to a first emitter 320, a second optical ring resonator 317 coupled to a second emitter 324). Each of the optical ring resonators may include a set of waveguides, in which at least one waveguide is a closed loop and may include the second waveguide 308 or a part of the second waveguide 308. The optical ring resonators are configured to couple an output beam (e.g., a first beam 358, a second beam 362) with the beam that has been directed to the second waveguide 308 (e.g., the beam in the second range of wavelength 354 in the first row 302). For example, when the beam 354 is passed through the loop of the optical ring resonator 316, and the wavelength of the beam 354 is or includes a resonant wavelength of the optical ring resonator 316, the optical ring resonator 316 builds up in intensity over multiple round-trips due to constructive interference. Because only a select few wavelengths will be at resonance within the loop, the optical ring resonators function as filtering the beam the emitter emits (e.g., the first beam 358 the first emitter 320 emits). In some embodiments, it is possible to create high-order optical filters by cascading many optical ring resonators in series.

In some embodiments, the resonant wavelengths of the ring resonators may be similar to one another, and thus the wavelengths of the output beams may be similar. For instance, the wavelength, $\lambda 1$, of the first beam 358, which has been filtered from the first optical ring resonator 316 and emitted from the first emitter 320, may be similar to the wavelength, $\lambda 2$, of the second beam 362, which has been filtered from the second optical ring resonator 317 and emitted from the second emitter 324.

In some embodiments, the resonant wavelengths of the ring resonators may be significantly different from one another. For instance, the wavelength, $\lambda 1$, of the first beam 358, which has been filtered from the first optical ring resonator 316 and emitted from the first emitter 320, may be significantly different from the wavelength, $\lambda 2$, of the second beam 362, which has been filtered from the second optical ring resonator 317 and emitted from the second emitter 324.

In some embodiments, the beam in the second range of wavelength 354 may be significantly different from the beam in the fourth range of wavelength 370 (e.g., using bandpass filters whose filtering wavelengths are significantly different), and the wavelength, $\lambda 1$, of the first beam 358 may be significantly different from the wavelength, $\lambda 2$, of the second beam 362 (e.g., using optical ring resonators whose resonant wavelengths are significantly different). Therefore, any combination of different wavelengths of beams over the two-dimensional array of emitters may be enabled.

Referring now to FIG. 4, example configurations 400, 450 of the beam steering system 100 are discussed herein. In the example configuration 400, the beam steering system 100 may include a one-dimensional array of emitters 404 (e.g., the one-dimensional array of emitters 200), a first optical device 408, and a second optical device 412. A light source (not depicted) transmits a beam to the one-dimensional array of emitters 404. The first optical device 408 may be, but not limited to, a lens or lens system, which is arranged along a path of a first beam 420 and a second beam 430 emitting from the one-dimensional array of emitters 404 and which is configured to direct the first beam 420 and the second beam 430 into another optical device (e.g., the second optical device 412). The second optical device 412 may be, but not limited to, a wavelength dispersive element. The wavelength dispersive element may include volume gratings, diffraction gratings, or other types of diffraction gratings disposed within or on a combiner or other device. In some embodiments, the wavelength dispersive elements may include a crystal, a prism, or other wavelength dispersive device in combination with other optical elements such as mirrors or lenses.

The first optical device 408 directs the first beam 420 into a first location of the second optical device 412, and directs the second beam 430 into a second location of the second optical device 412, wherein the first location corresponds to a wavelength of the first beam 420 or a location of the emitter that emits the first beam 420, and the second location corresponds to a wavelength of the second beam 430 or a location of the emitter that emits the second beam 430. The second optical device 412 directs the first beam 420 and the second beam 430 into an external environment of the beam steering system 100. The second optical device 412 directs the first beam 420 at a first angle and directs the second beam 430 at a second angle, wherein the first angle and the second angle may be different. The angle at which the second optical device 412 directs the beam into the external environment may correspond to the wavelength of the beam, an incident angle at which the beam is directed to the second optical device 412, or a location of the emitter that emits the beam.

In the example configuration 450, the beam steering system 100 may include a two-dimensional array of emitters 454 (e.g., the two-dimensional array of emitters 300) and an optical device 458. The optical device 458 may be, but not limited to, a lens or lens system, which is arranged along a path of a first beam 470 and a second beam 480 emitting from the two-dimensional array of emitters 454. The optical device 458 directs the first beam 470 and the second beam 480 into an external environment of the beam steering system 100. The optical device 458 directs the first beam 470 into a first location of the external environment, and directs the second beam 480 into a second location of the external environment, wherein the first location corresponds to a wavelength of the first beam 470 or a location of the emitter that emits the first beam 470, and the second location corresponds to a wavelength of the second beam 480 or a location of the emitter that emits the second beam 480.

Figure 5:
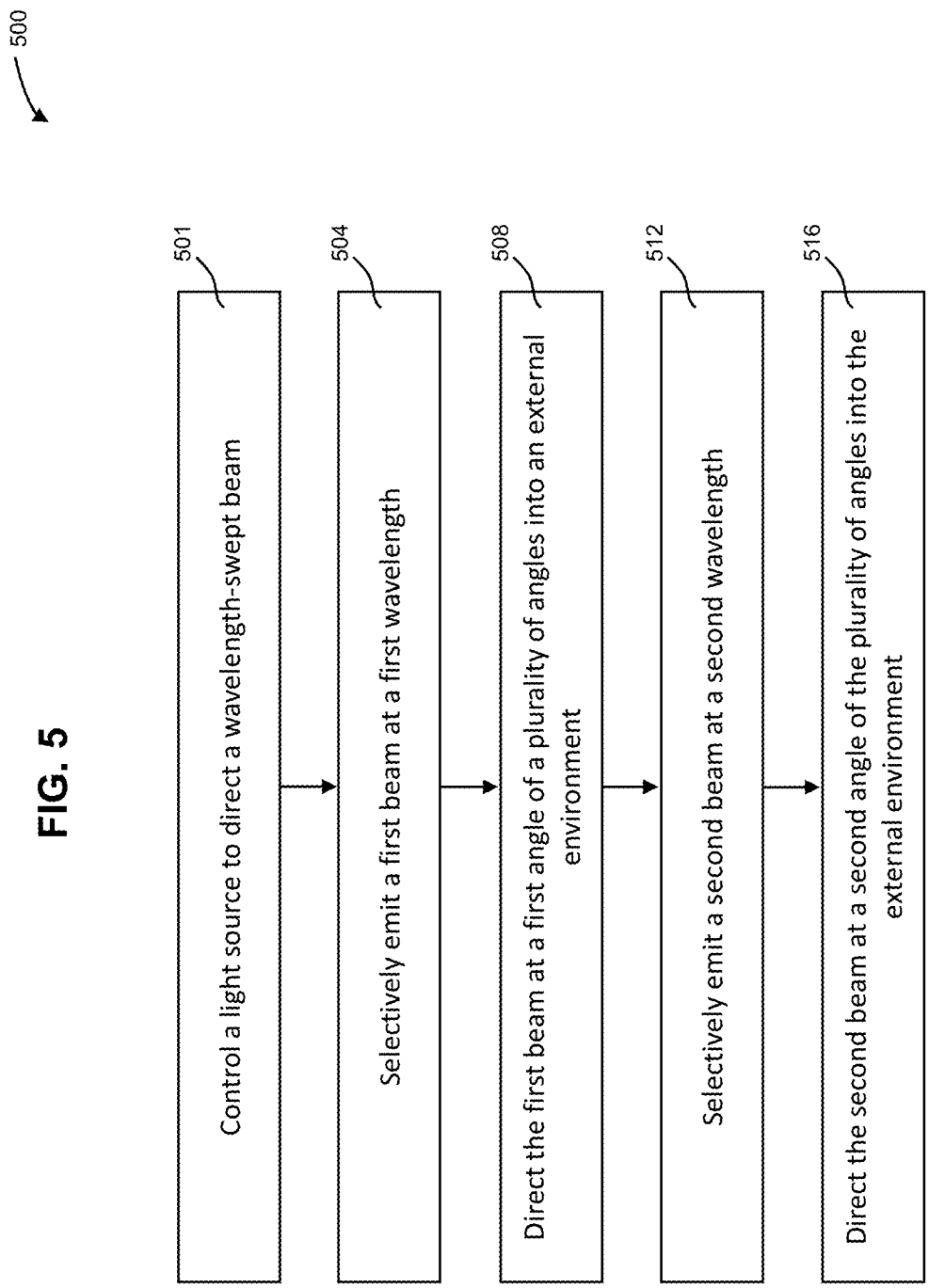
FIG. 5 depicts a method of using a beam steering system in accordance with an illustrative embodiment.

FIG. 5 depicts a flow diagram of a method 500 of utilizing the beam steering system 100. At an operation 501, a light source is controlled to generate a wavelength-swept beam and to direct the beam into an array of emitters. In some embodiments, the beam may be directed to the array of emitters via one or more optical components (e.g., waveguide, optical switch, bandpass filter, etc.). In some embodiments, the light source is controlled to generate a beam that sweeps from a first frequency at a first time continuously to a second frequency at a second time. In some embodiments, the sweep of the beam over the frequencies is linear with a particular slope. In some embodiments, the sweep of the beam over the frequencies is non-linear. In some embodiments, the light source is controlled to re-sweep the frequencies at a time after the first time. That is, the light source is controlled to re-sweep the frequencies to generate multiple frames.

At an operation 504, a first emitter of the array of emitters, which have received a first source beam from the light source, selectively emits a first beam at a first wavelength. The first wavelength may be a portion of wavelengths of the first source beam. One or more optical components (e.g., optical ring resonator) may be coupled with the emitter to emit the first beam at the first wavelength.

In some embodiments, the array of emitters may be a one-dimensional array of emitters. The emitters in the one-dimensional array of emitters may be connected to a waveguide, via which the source beam is directed to the emitters in the array of emitter. In some embodiments, the array of emitters may include optical ring resonators coupled with the emitters in the array of emitters. The optical ring resonators are configured to couple the beam directed to the emitters with the beams the emitters emit at a resonant wavelength to filter the beam the emitters emit. In some embodiments, it is possible to create high-order optical filters by cascading many optical ring resonators in series. In some embodiments, the resonant wavelengths of the ring resonators coupled to the emitters may be similar to one another. In some embodiments, the resonant wavelengths of the ring resonators coupled to the emitters may be significantly different from one another.

In some embodiments, the array of emitters may be a two-dimensional array of emitters. The two-dimensional array of emitters includes a plurality of rows of emitters, wherein the plurality of rows are connected to a first waveguide and the emitters within each of the rows are connected to a second waveguide. The plurality of rows may include various optical components (e.g., beam transmitting components, optical ring resonators, etc.). In some embodiments, the first waveguide and the second waveguides may form a continuous line of waveguide. The first waveguide directs the source beam into the second waveguides. The second waveguides receive a portion of the source beam and direct the portion of the beam into the emitters in the row. The portion of the source beam may be a portion of wavelengths of the source beam. For example, the source beam may be in a first range of wavelength. The second waveguide in a first row of the array of emitters may receive a portion of the source beam in a second range of wavelength, the second range of wavelength being a portion of the first range of wavelength. At another time, the source beam may be in a third range of wavelength, the third range of wavelength may or may not be similar to the first range of wavelength. The second waveguide in a second row may receive a portion of the source beam in a fourth range of wavelength, the fourth range of wavelength being a portion of the third range of wavelength, while the second waveguide in the first row may or may not receive a portion of the source beam.

The method may include utilizing beam transmitting components, which selectively transmit a portion of the source beam into the second waveguides. The beam transmitting components may be coupled with the first waveguide and/or the second waveguides.

In some embodiments, the method may include utilizing optical switches for transmitting components. In some embodiments, the first waveguide is a bus line waveguide wherein an optical switch is coupled to the second waveguide of each row and/or the first waveguide. The optical switches control whether to transmit the source beam into the second waveguides. For example, the optical switch in the first row controls whether the beam in the second range of wavelength can be transmitted into the first row, and the optical switch in the second row controls whether the beam in the fourth range of wavelength can be transmitted into the second row. In some embodiments, the second range of wavelength and the fourth range of wavelength may be similar.

In some embodiments, the method may include utilizing bandpass filters for the beam transmitting components. In some embodiments, the first waveguide is a bus line waveguide wherein a bandpass filter is coupled to the second waveguide of each row and/or the first waveguide. The bandpass filters determine a range of wavelength to transmit into the second waveguides. For example, the bandpass filter in the first row determines the second range of wavelength of the beam to be transmitted into the first row, and the bandpass filter in the second row determines the fourth range of wavelength of the beam to be transmitted into the second row. In some embodiments, the second range of wavelength and the fourth range of wavelength may be significantly different. In some embodiments, the beam transmitting components may be active tunable filters, which are synchronously tuned to coincide with a portion of the source beam. For instance, the active tunable filter in the first row is synchronously tuned to coincide with the beam in the second range of wavelength to be transmitted into the first row, and the active tunable filter in the second row is synchronously tuned to coincide with the beam in the fourth range of wavelength to be transmitted into the second row, wherein the second range of wavelength and the fourth range of wavelength may be significantly different.

In some embodiments, the array of emitters may include optical ring resonators coupled with the emitters in the array of emitters. The optical ring resonators are configured to couple the source beam and the beams the emitters emit at a resonant wavelength and to filter the beams the emitters emit. In some embodiments, it is possible to create high-order optical filters by cascading many optical ring resonators in series. In some embodiments, the resonant wavelengths of the ring resonators coupled to the emitters within a same row may be similar to one another. In some embodiments, the resonant wavelengths of the ring resonators coupled to the emitters within a same row may be significantly different from one another. In some embodiments, the resonant wavelengths of the ring resonators coupled to the emitters within a row may be similar to the resonant wavelengths of the ring resonators coupled to the emitters within another row. In some embodiments, the resonant wavelengths of the ring resonators coupled to the emitters within a row may be significantly different from the resonant wavelengths of the ring resonators coupled to the emitters within another row. Therefore, any combination of different wavelengths of the beams emitting from the emitters over the two-dimensional array of emitters may be enabled.

At an operation 508, an optical device, arranged along a path of the first beam, receives the first beam from the first emitter and directs the first beam at a first angle into an external environment of the beam steering system.

In some embodiments, the optical device may include one or more optical components. In some embodiments, the optical device may include a first optical device and a second optical device. The first optical device may be, but not limited to, a lens, and the second optical device may be, but not limited to, a wavelength dispersive element. The first optical device directs a first beam toward a first location of the second optical device, and directs a second beam toward a second location of the second optical device, wherein the first location corresponds to a wavelength of the first beam or a location of the emitter that emits the first beam, and the second location corresponds to a wavelength of the second beam or a location of the emitter that emits the second beam. The second optical device directs the first beam and the second beam into an external environment of the beam steering system. The second optical device directs the first beam at a first angle and direct the second beam at a second angle, wherein the first angle and the second angle may be different. The angle at which the second optical device directs the beam into the external environment may correspond to the wavelength of the beam, an incident angle at which the beam is directed to the second optical device, or a location of the emitter that emits the beam.

In some embodiments, the optical device may be an optical component. The optical device may be, but not limited to, a lens or lens system. The optical device directs a first beam and a second beam into an external environment of the beam steering system. The optical device directs the first beam into a first location of the external environment, and directs the second beam into a second location of the external environment, wherein the first location corresponds to a wavelength of the first beam or a location of the emitter that emits the first beam, and the second location corresponds to a wavelength of the second beam or a location of the emitter that emits the second beam. For instance, the optical device may direct the first beam into the first location of the external environment and to direct the second beam into the second location of the external environment, wherein the first location and the second location may be different.

At an operation 512, a second emitter of the array of emitters, which have received a second source beam from the light source, selectively emits a second beam at a second wavelength. The second wavelength may be a portion of wavelengths of the second source beam. One or more optical components (e.g., optical ring resonator) may be coupled with the emitter to emit the second beam at the second wavelength. In some embodiments, the second source beam may be the first source beam. In some embodiments, the second source beam may be a source beam identical to the first source beam but provided at another time. In some embodiments, the second source beam may be different from the first source beam.

At an operation 516, the optical device receives the second beam from the second emitter and direct the second beam at a second angle into the external environment of the beam steering system, wherein the second angle may be different from the first angle.

Figure 6:
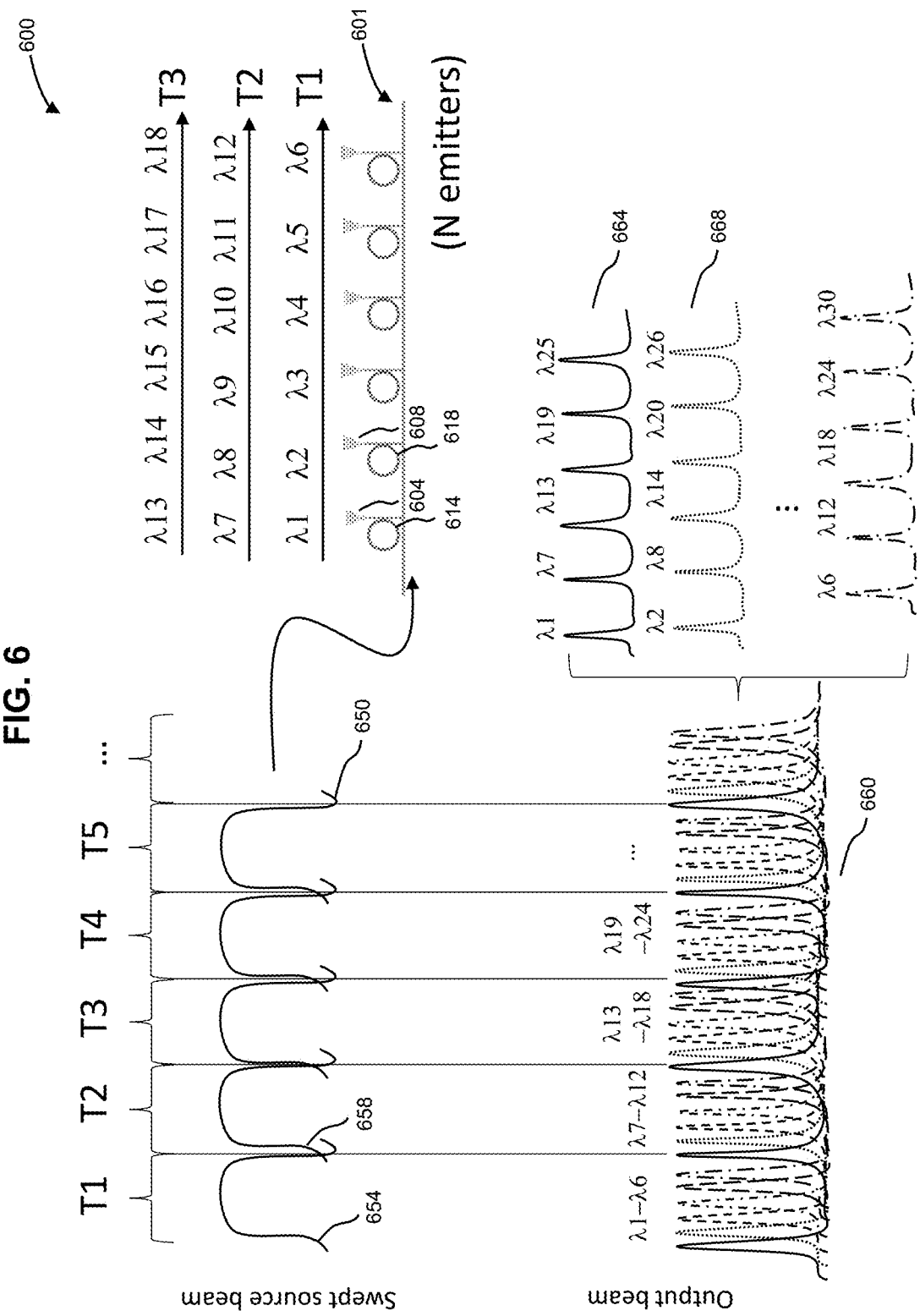
FIG. 6 depicts example embodiments of a one-dimensional array of emitters in accordance with an illustrative embodiment.

Referring to FIG. 6, example embodiments 600 of a one-dimensional array of emitters 601 are depicted. The one-dimensional array of emitters 601 herein includes a plurality of emitters (e.g., a first emitter 604, a second emitter 608) and a plurality of optical ring resonators, each optical ring resonator coupled with each emitter (e.g., a first optical ring resonator 614 coupled with the first emitter 604, a second optical ring resonator 618 coupled with the second emitter 608). The array of emitters 601 may have N emitters, and depicted is the array of emitters 601 with N=6. The optical ring resonator may be configured to operate at a set of resonator modes, each of the resonator modes having a spacing from an adjacent resonator mode defined as a free spectral range (FSR). For instance, the first ring resonator 614 may be configured to operate at a first set of resonator modes 664 (e.g., peaks $\lambda 1$, $\lambda 7$, $\lambda 13$, ..., $\lambda 25$) with a first FSR, and the second ring resonator 618 may be configured to operate at a second set of resonator modes 668 with a second FSR. In some embodiments, different optical ring resonators may have a same FSR. In some embodiments, for example, the first ring resonator 614 may be configured to operate at the first set of resonator modes 664 including $\lambda 1$, $\lambda 7$, $\lambda 13$, ..., $\lambda 25$, as shown in FIG. 6. For example, the second ring resonator 618 may be configured to operate at the second set of resonator modes 668 including $\lambda 2$, $\lambda 8$, $\lambda 14$, ..., $\lambda 26$, as shown in FIG. 6.

In some embodiments, a source beam 650 may be a swept source beam. The source beam may be in different ranges of wavelength at different times. For example, a first source beam 654 at T1 may be at a first range of wavelength, and a second source beam 658 at T2 may be at a second range of wavelength. In some embodiments, when the first source beam 654 is directed to the array of emitters 601, the emitters emit beams only at wavelengths that are included in the set of resonator modes of the coupled optical ring resonators and that are covered by the first source beam 654. For example, when the first source beam 654 in the first range of wavelength, which covers $\lambda 1$-$\lambda 6$ but not $\lambda 7$-$\lambda 30$, is directed to the array of emitters 601 at T1, the first emitter 604 emits only at $\lambda 1$ at T1 because its emission is limited to the first set of resonator modes 664 (i.e., $\lambda 1$, $\lambda 7$, $\lambda 13$, ..., $\lambda 25$) and the other wavelengths (e.g., $\lambda 7$, $\lambda 13$, ..., $\lambda 25$) are not covered by the first source beam 654. Likewise, the second emitter 608 emits only at $\lambda 2$ at T1 because its emission is limited to the second set of resonator modes 668 (i.e., $\lambda 2$, $\lambda 8$, $\lambda 14$, ... $\lambda 26$) and the other wavelengths (e.g., $\lambda 8$, $\lambda 14$, ..., $\lambda 26$,) are not covered by the first source beam 654. At different times (e.g., T2), when the second source beam 658 in the second range of wavelength, which covers $\lambda 7$-$\lambda 12$ but not $\lambda 1$-$\lambda 6$ or $\lambda 13$-$\lambda 30$, is directed to the array of emitters 601, the first emitter 604 emits only at $\lambda 7$ at T2 because its emission is limited to the first set of resonator modes 664 (i.e., $\lambda 1$, $\lambda 7$, $\lambda 13$, ..., $\lambda 25$) and the other wavelengths (e.g., $\lambda 1$, $\lambda 13$, ..., $\lambda 25$) are not covered by the second source beam 658. Likewise, the second emitter 608 emits only at $\lambda 8$ at T2 because its emission is limited to the second set of resonator modes 668 (i.e., $\lambda 2$, $\lambda 8$, $\lambda 14$, ... $\lambda 26$) and the other wavelengths (e.g., $\lambda 2$, $\lambda 14$, ..., $\lambda 26$) are not covered by the second source beam 658. This allows an output beam 660 to be emitted at different wavelengths from different emitters at different times.

In some embodiments, an operating wavelength of each optical ring resonator in the array of emitters 601 may be offset by a value (e.g., FSR/N) from an operating wavelength of neighboring optical ring resonator, wherein N is the number of emitters in the array of emitters 601. For example, $\lambda 2$ may be offset by FSR/N from $\lambda 1$, $\lambda 3$ may be offset by FSR/N from $\lambda 2$, $\lambda 4$ may be offset by FSR/N from $\lambda 3$, $\lambda 5$ may be offset by FSR/N from $\lambda 4$, and $\lambda 6$ may be offset by FSR/N from $\lambda 5$. In some embodiments, the range of wavelengths $\lambda 1$-$\lambda 6$ covers a bandwidth of the first source beam 654.

Figure 7:
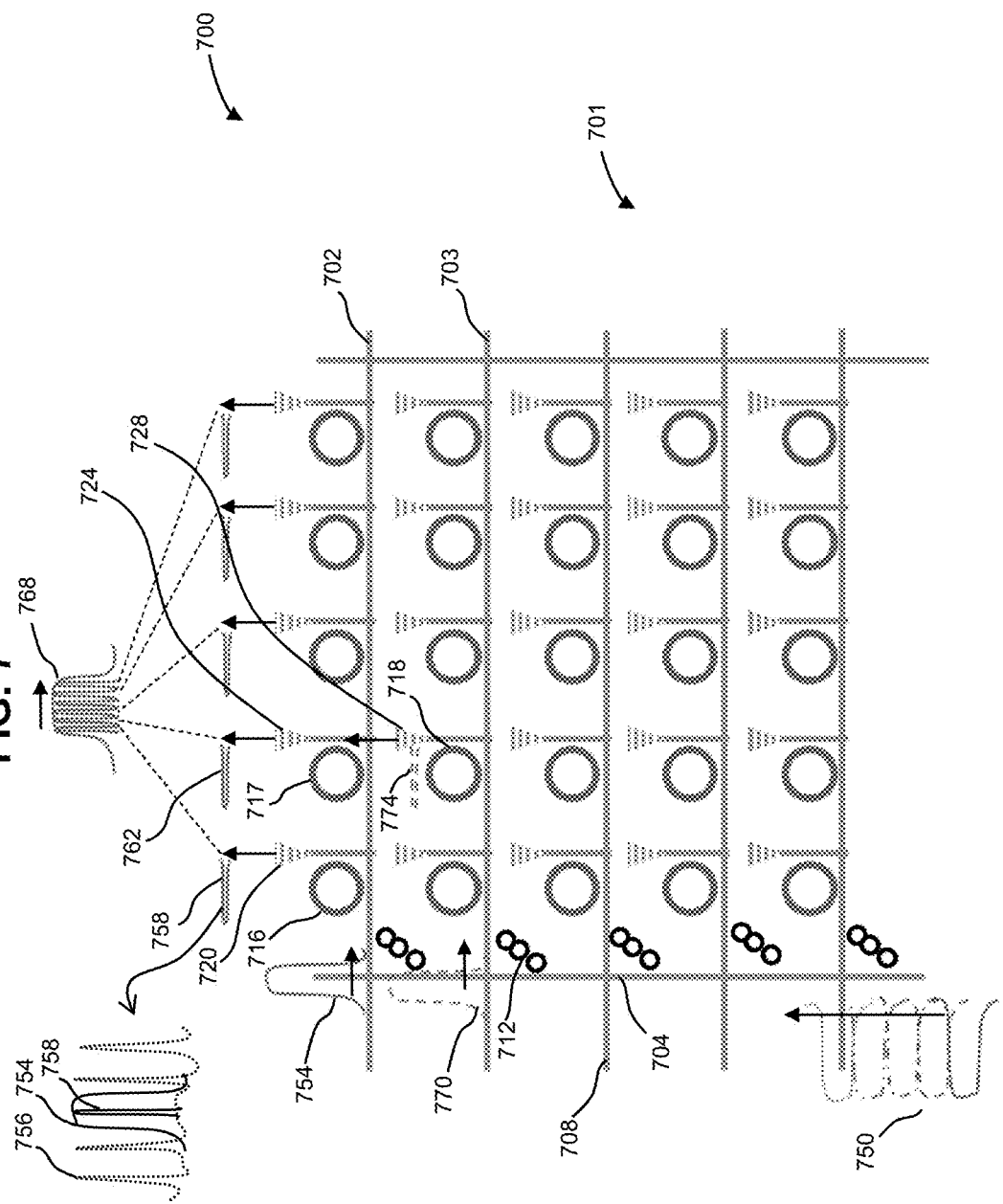
FIG. 7 depicts example embodiments of a two-dimensional array of emitters in accordance with an illustrative embodiment.

Referring to FIG. 7, example embodiments 700 of a two-dimensional array of emitters 701 are depicted. The two-dimensional array of emitters 701 herein includes a plurality of rows (e.g., a first row 702, a second row 703), the rows including a plurality of emitters (e.g., a first emitter 720, a second emitter 724). The plurality of rows are connected to a first waveguide 704, and the emitters within each of the rows are connected to a second waveguide 708. The first waveguide 704 may be a bus line waveguide. The example embodiments further include beam transmitting components 712 to selectively transmit a portion of a source beam 750 into the second waveguides 708. For instance, the source beam 750 may be in a first range of wavelength, and a beam in a second range of wavelength 754, which is a portion of the source beam 750, may be transmitted into the first row 702. At another time, the source beam 750 may be in a third range of wavelength, and a beam in a fourth range of wavelength 770, which is a portion of the source beam 750, may be transmitted into the second row 703. In some embodiments, the first range of wavelength and the third range of wavelength are similar or identical.

In some embodiment, the example embodiments include optical switches for beam transmitting components 712. The beam transmitting components 712 (optical switches here) are configured to control whether to transmit a portion of the source beam 750 into the second waveguide 708. For example, the beam transmitting component 712 in the first row 702 is configured to control whether the beam in the second range of wavelength 754 can be transmitted into the first row 702, and the beam transmitting component 712 in the second row 703 is configured to control whether the beam in the fourth range of wavelength 770 can be transmitted into the second row 703. In some embodiments, the second range of wavelength and the fourth range of wavelength may be similar.

In some embodiments, the example embodiments include bandpass filters for the beam transmitting components 712. The beam transmitting components 712 (bandpass filters here) are configured to determine a range of wavelength to transmit into the second waveguides 708. For example, the beam transmitting component 712 in the first row 702 is configured to determine the second range of wavelength of the beam 754 to be transmitted into the first row 702, and the beam transmitting component 712 in the second row 703 is configured to determine the fourth range of wavelength of the beam 770 to be transmitted into the second row 703. In some embodiments, the second range of wavelength and the fourth range of wavelength may be significantly different. In some embodiments, the beam transmitting components 712 may be active tunable filters, which are synchronously tuned to coincide with a portion of the source beam 750. For instance, the beam transmitting component 712 in the first row 702 may be an active tunable filter that is synchronously tuned to coincide with the beam in the second range of wavelength 754, and the beam transmitting component 712 in the second row 703 may be an active tunable filter that is synchronously tuned to coincide with the beam in the fourth range of wavelength 770, wherein the second range of wavelength and the fourth range of wavelength may be significantly different. In some embodiments, active tunable filters may be utilized for the beam transmitting components 712. The active tunable filters are synchronously tuned to coincide with a portion of the source beam. For instance, the active tunable filter in the first row is synchronously tuned to coincide with the beam in the second range of wavelength to be transmitted into the first row, and the active tunable filter in the second row is synchronously tuned to coincide with the beam in the fourth range of wavelength to be transmitted into the second row, wherein the second range of wavelength and the fourth range of wavelength may be significantly different.

The example embodiments may include optical ring resonators. A first optical ring resonator 716 connected to the first emitter 720 is configured to filter the beam in the second range of wavelength 754 so the first emitter 720 emits a first beam 758 at a first wavelength. Likewise, a second optical ring resonator 717 connected to the second emitter 724 is configured to filter the beam in the second range of wavelength 754 so the second emitter 724 emits a second beam 762 at a second wavelength. Likewise, a third optical ring resonator 718 connected to a third emitter 728 is configured to filter the beam in the fourth range of wavelength 770 so the third emitter 728 emits a third beam 774 at a third wavelength. In some embodiments, the third wavelength may be significantly different from the first and the second wavelengths. In some embodiments, the first wavelength and the second wavelength may be similar. For example, a set of wavelengths of emitters from a same row are collectively form a range of wavelength 768. In some embodiments, the first wavelength and the second wavelength may be significantly different.

In some embodiments, the optical ring resonator 716 may be configured to operate at a first set of resonator modes 756, and the coupled emitter (i.e., the first emitter 720) may emit at one of wavelength within the first set of resonator modes 756. For example, the beam transmitting component 712 (e.g., bandpass filter) may be configured to transmit only beams having a certain range of wavelength (e.g., the second range of wavelength 754), the certain range covering only a portion (e.g., the beam 758) of the set of resonator modes 756. In some embodiments, the second range of wavelength 754 may be a bandwidth of the beam transmitting component 712. In some embodiments, the second range of wavelength 754 and/or such a bandwidth may be similar or identical to the FSR of the ring resonator. In this manner, neighboring modes of the set of resonator modes 756 may be removed, and the first emitter 720 can emit at one wavelength or a portion of the set of resonator modes 756 (e.g., the beam 758). This allows for emission of only an assigned wavelength at a corresponding location during a wavelength sweep, while covering the range of wavelength 768 by the arrayed emitters (e.g., 720, 724) configured to operate at different sets of resonator modes.

In some embodiments, the optical ring resonators in the first column may be configured to operate at a first set of resonator modes (e.g., 664), and the optical ring resonators in the second column may be configured to operate at a second set of resonator modes (e.g., 668), wherein the beam transmitting component 712 in the first row 702 may be configured to transmit beams having a first range of wavelength (e.g., $\lambda1$-$\lambda6$), and the beam transmitting component 712 in the second row 703 may be configured to transmit beams having a second range of wavelength (e.g., $\lambda7$-$\lambda12$). Since the first optical ring resonator 716 in the first row 702 is configured to operate at the first set of resonator modes (e.g., $\lambda1$, $\lambda7$, $\lambda13$, . . . , $\lambda25$) and the beam transmitting component 712 in the first row 702 transmits only the first range of wavelength (e.g., $\lambda1$-$\lambda6$), the first emitter 720 coupled with the first optical ring resonator 716 in the first row 702 emits at $\lambda1$. Likewise, since the second optical ring resonator 717 in the first row 702 is configured to operate at the second set of resonator modes (e.g., $\lambda2$, $\lambda8$, $\lambda14$, . . . , $\lambda26$) and the beam transmitting component 712 in the first row 702 transmits only the first range of wavelength (e.g., $\lambda1$-$\lambda6$), the second emitter 724 coupled with the second optical ring resonator 717 in the second column and the first row 702 emits at $\lambda2$. Likewise, since the optical ring resonator 718 in the second column and the first second row 703 is configured to operate at the second set of resonator modes (e.g., $\lambda2$, $\lambda8$, $\lambda14$, . . . , $\lambda26$) and the beam transmitting component 712 in the second row 703 transmits only the second range of wavelength (e.g., $\lambda7$-$\lambda12$), the emitter 728 coupled with the optical ring resonator 718 in the second column and the second row 703 emits at $\lambda8$. This allows for emission of only an assigned wavelength at a corresponding location during a wavelength sweep, while covering the range of the source beam 750 by the arrayed emitters configured to operate at different sets of resonator modes.

Controlling a status of optical switches (i.e., on/off) or adjusting filtering wavelengths of bandpass filters allows for selective activation of each row at different times. Adjusting resonant wavelengths of optical ring resonators within each of the rows further allows for selective activation of each emitter at different times. Activation of different wavelengths and/or different locations of emitters cause output beams to be directed toward different locations of an external environment. Therefore, the beam steering system disclosed herein and the methods of utilizing the same allow for rapid steering of beams using selective activation of emitters and wavelength sweep.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Additional embodiments may be set forth in the following claims.

What is claimed is:

1. A beam steering system, comprising:
   a tunable light source configured to direct a wavelength-swept beam;
   an array of emitters, wherein
   a first emitter of the array of emitters is configured to selectively emit a first beam at a first wavelength, the first wavelength is a portion of wavelengths of a first wavelength-swept beam, and
   a second emitter of the array of emitters is configured to selectively emit a second beam at a second wavelength, the second wavelength is a portion of wavelengths of a second wavelength-swept beam and is different from the first wavelength; and
   an optical device, arranged along a path of the first beam and the second beam, the optical device configured to receive the first beam and the second beam and to direct the first beam at a first angle and the second beam at a second angle into an external environment of the beam steering system.

2. The system of claim 1, wherein
   at least one of the emitters is coupled with an optical ring resonator; and
   an operating wavelength of the optical ring resonator is associated with the wavelength at which the coupled emitter emits the beam.

3. The system of claim 1, further comprising
   an optical component configured to receive the wavelength-swept beam from the light source and to selectively transmit at least a portion of the beam to at least one of the emitters.

4. The system of claim 1, wherein the array is a one-dimensional array.

5. The system of claim 4, wherein
   each emitter is coupled with an optical ring resonator with a free spectral range (FSR); and
   an operating wavelength of each optical ring resonator is offset by FSR/N from an operating wavelength of a neighboring optical ring resonator, wherein N is a number of emitters in the array.

6. The system of claim 1, wherein the array is a two-dimensional array, the array comprising a plurality of rows, each row comprising a plurality of the emitters.

7. The system of claim 6, wherein
   the emitters within each row are connected to each other through a waveguide; and
   the rows are connected to a bus line via an optical switch.

8. The system of claim 6, wherein
   the emitters within each row are connected to each other through a waveguide;
   the connected emitters within a first row emit the beams in a second range of wavelength, the second range of wavelength is a portion of a first range of wavelength of the wavelength-swept beam;
   the connected emitters within a second row emit the beams in a fourth range of wavelength, the fourth range of wavelength is a portion of a third range of wavelength of the wavelength-swept beam and is different from the second range of wavelength; and
   the rows are connected to a bus line via a bandpass filter.

9. The system of claim 8, wherein
   the bandpass filter is an active tunable filter synchronously tuned to coincide with the range of wavelength in which the emitters of each row emit the beams.

10. A method of utilizing a beam steering system, the method comprising:
    controlling a tunable light source to direct a wavelength-swept beam;
    selectively emitting, by a first emitter of the array of emitters, a first beam at a first wavelength, the first wavelength being a portion of wavelengths of a first wavelength-swept beam;
    receiving, by an optical device arranged along a path of the first beam, the first beam;
    directing, by the optical device, the first beam at a first angle of a plurality of angles into an external environment of the beam steering system;
    selectively emitting, by a second emitter of the array of emitters, a second beam at a second wavelength, the second wavelength being a portion of wavelengths of a second wavelength-swept beam;
    receiving, by the optical device, the second beam; and
    directing, by the optical device, the second beam at a second angle of the plurality of angles into the external environment of the beam steering system.

11. The method of claim 10, further comprising:
    narrowing, by utilizing an optical ring resonator, a range of wavelength of the beams being emitted from the emitters.

12. The method of claim 10, further comprising:
    selectively transmitting, by an optical component, the beam to the emitters.

13. The method of claim 10, wherein the second wavelength-swept beam is the first wavelength-swept beam.

14. The method of claim 10, wherein the array of emitters is a one-dimensional array.

15. The method of claim 14, further comprising:
    selectively filtering, by utilizing an optical ring resonator with a free spectral range (FSR), the wavelength at which each emitter emits; and
    offsetting an operating wavelength of each optical ring resonator by FSR/N from an operating wavelength of a neighboring optical ring resonator, wherein N is a number of emitters in the array.

16. The method of claim 10, wherein the array of emitters is a two-dimensional array, the array comprising a plurality of rows, each row comprising a plurality of the emitters.

17. The method of claim 16, further comprising:
    directing the first beam in a first range of wavelength towards each row of the array;
    selectively transmitting, based on a status of an optical switch connected to each row, the first beam in a second range of wavelength to the emitters in one of the rows;

selectively emitting, by one of the emitters within the row, the beam at the first wavelength;

directing the second beam in a third range of wavelength towards each row of the array;

selectively transmitting, based on the status of the optical switch connected to each row, the second beam in a fourth range of wavelength to the emitters in another row of the rows; and selectively emitting, by one of the emitters within the row, the beam at the second wavelength.

18. The method of claim 16, further comprising:

directing the first beam in a first range of wavelength towards each row of the array;

selectively transmitting, based on an operating wavelength of a bandpass filter connected to each row, the first beam in a second range of wavelength to the emitters in one of the rows, the second range of wavelength associated with the operating wavelength of the bandpass filter;

selectively emitting, by one of the emitters within the row, the beam at the first wavelength;

directing the second beam in a third range of wavelength towards each row of the array;

selectively transmitting, based on the operating wavelength of the bandpass filter connected to each row, the second beam in a fourth range of wavelength to the emitters in another row of the rows, the fourth range of wavelength associated with the operating wavelength of the bandpass filter; and selectively emitting, by one of the emitters within the row, the beam at the second wavelength.

19. The method of claim 18, further comprising:

utilizing an active tunable filter for the bandpass filter to synchronously coincide with the range of wavelength in which the emitters of each row emit the beams.

20. The method of claim 16, further comprising:

utilizing a first stage wide filter with a bandwidth equal to a free spectra range (FSR) of an optical ring resonator to narrow the range of wavelength of the beams being transmitted to the rows of emitters; and further limiting the range of wavelength of the transmitted beam by the optical ring resonator.

\* \* \* \* \*